US009246174B2

(12) United States Patent
Nakamura (10) Patent No.: US 9,246,174 B2
(45) Date of Patent: Jan. 26, 2016

(54) LITHIUM ION BATTERY (75) Inventor: Akinobu Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 46 days.

(21) Appl. No.: 14/237,904

(22) PCT Filed: Jun. 13, 2012

(86) PCT No.: PCT/JP2012/065090
§ 371 (c)(1),
(2), (4) Date: Feb. 10, 2014

(87) PCT Pub. No.: WO2013/024621
PCT Pub. Date: Feb. 21, 2013

(65) Prior Publication Data
US 2014/0170481 A1 Jun. 19, 2014

(30) Foreign Application Priority Data

Aug. 17, 2011 (JP) ................. 2011-178299

(51) Int. Cl.
H01M 4/02 (2006.01)
H01M 4/62 (2006.01)
H01M 4/131 (2010.01)
H01M 4/505 (2010.01)
(Continued)

(52) U.S. Cl.
CPC ............. H01M 4/628 (2013.01); H01M 4/131 (2013.01); H01M 4/505 (2013.01); H01M 10/0525 (2013.01); H01M 10/0567 (2013.01); Y02E 60/122 (2013.01); Y02T 10/7011 (2013.01)

(58) Field of Classification Search
CPC . H01M 4/505; H01M 10/0567; H01M 4/131; H01M 4/485
See application file for complete search history.

(56) References Cited

U.S. PATENT DOCUMENTS

2007/0154815 A1* 7/2007 Kawasaki et al. ............. 429/340
2011/0064998 A1* 3/2011 Abe et al. ...................... 429/188
(Continued)

FOREIGN PATENT DOCUMENTS

| JP | 10-302767 | 11/1998 |
| JP | 2002-260632 | 9/2002 |
| JP | 3498947 | 2/2004 |
| JP | 2004-199909 | 7/2004 |

(Continued)

OTHER PUBLICATIONS

International Search Report mailed Aug. 7, 2012.

Primary Examiner — Stewart Fraser
Assistant Examiner — Olatunji Godo
(74) Attorney, Agent, or Firm — Finnegan, Henderson, Farabow, Garrett & Dunner LLP (57) ABSTRACT It is an object of this exemplary embodiment to provide a lithium ion battery using a lithium manganese complex oxide, in which the dissolution of manganese and resistance increase are inhibited, and which is excellent in life characteristics at high temperature. One aspect of this exemplary embodiment is a lithium ion battery comprising at least a positive electrode comprising a positive electrode active material, and an electrolytic solution, wherein the positive electrode active material is a lithium manganese complex oxide, the positive electrode comprises a bismuth oxide, and a metal compound attached to part of a surface of the lithium manganese complex oxide, and a dissolution rate of a metal of the metal compound in the electrolytic solution is lower than a dissolution rate of manganese of the lithium manganese complex oxide.

17 Claims, 4 Drawing Sheets (51) Int. Cl.
*H01M 10/0567* (2010.01)
*H01M 10/0525* (2010.01)

(56) References Cited

U.S. PATENT DOCUMENTS

2011/0076556 A1* 3/2011 Karthikeyan et al. ......... 429/188
2012/0183842 A1* 7/2012 Kawasaki et al. ............. 429/163

FOREIGN PATENT DOCUMENTS

| JP | 2006-036545 | | 2/2006 |
| JP | 2008-218387 | | 9/2008 |
| JP | 2008-536285 | | 9/2008 |
| JP | 4202581 | | 12/2008 |
| JP | 2009-163939 | | 7/2009 |
| WO | WO 2009/133899 | A1 | 11/2009 |
| WO | WO2011040443 | * | 4/2011 |

* cited by examiner

LITHIUM ION BATTERY

CROSS-REFERENCE TO RELATED PATENT APPLICATIONS

This application is a National Stage Entry of International Application No. PCT/JP2012/065090, filed Jun. 13, 2012, which claims priority from Japanese Patent Application No. 2011-178299, filed Aug. 17, 2011. The entire contents of the above-referenced applications are expressly incorporated herein by reference.

TECHNICAL FIELD

The present invention relates to a lithium ion battery.

BACKGROUND ART

In recent years, the application of lithium ion batteries to driving batteries for motorcycles and electric cars, and further to industrial batteries combined with primary power sources, such as solar batteries and wind power generation, in addition to small size equipment applications, such as cellular phones and notebook computers, has been promoted. In such large size applications, the cell size and number of cells that are laminated increase significantly, and the battery capacity also increases incomparably, compared with conventional small size applications, and therefore, their safety and cost have taken on increased important. From such a viewpoint, applying lithium manganese complex oxides to positive electrode materials has been studied.

Lithium manganese complex oxides are known as positive electrode materials having high safety because the oxygen desorption start temperature during charge is higher than that of layered lithium nickelate and lithium cobaltate. In addition, manganese, a main component, is more abundant in terms of resources and is also less costly than nickel and cobalt, and therefore, the lithium manganese complex oxides have great merits particularly in large size applications. Further, in the lithium manganese complex oxides, by replacing part of manganese in the crystal structure with other transition metals, such as nickel, the discharge potential increases to the 4.5 to 5 V range (vs. Li/Li+), and higher energy density can be achieved as the so-called 5 V class positive electrodes.

However, it is indicated that in lithium ion batteries using lithium manganese complex oxides, manganese is easily dissolved in high temperature environments, and problems include storage deterioration and cycle deterioration at high temperature. This is considered to be because water that present in the electrolytic solution, as an impurity, reacts with $LiPF_6$ that is added as a supporting salt to produce HF, a strong acid, and this HF reacts with the lithium manganese complex oxide to thereby dissolve the manganese. The manganese dissolved in the electrolytic solution is deposited on the separator and the negative electrode, and therefore, it may become resistant to lithium ion diffusion, break the film (SEI) on the negative electrode, and further become a catalyst decomposing the electrolytic solution on the negative electrode. Therefore, it is thought that when manganese is dissolved, the battery characteristics deteriorate.

In order to inhibit the dissolution of manganese in the electrolytic solution, Patent Literature 1 discloses a method for modifying the surface of a lithium manganese complex oxide with a bismuth compound.

In addition, Patent Literature 2 discloses a lithium manganese complex oxide on the surface of which an $Al_2O_3$ layer obtained from an aluminum alkoxide solution is formed.

CITATION LIST

Patent Literature

Patent Literature 1: JP3498947B
Patent Literature 2: JP4202581B

SUMMARY OF INVENTION

Technical Problem

However, a problem of Patent Literature 1 is that the bismuth oxide that modifies the surface of the lithium manganese complex oxide is dissolved in the electrolytic solution like manganese. The inventor has examined the dissolution rate of each material in an electrolytic solution widely used in lithium ion batteries, and as a result, it has become clear that the dissolution rate of a bismuth oxide ($Bi_2O_3$) is higher than that of a lithium manganese complex oxide. In other words, when the surface of a lithium manganese complex oxide is modified with a bismuth oxide, the dissolution of manganese is temporarily suppressed, but the surface-modifying bismuth oxide disappears by its dissolution, and therefore, the dissolution of manganese cannot be substantially suppressed in some cases.

On the other hand, it is presumed that in the method of Patent Literature 2, manganese dissolution is inhibited by the physical coating effect of the $Al_2O_3$ layer formed on the surface of the lithium manganese complex oxide. However, when the entire surface of the lithium manganese complex oxide is completely coated with the $Al_2O_3$ layer, $Al_2O_3$ may develop high resistance to lithium ion insertion and desorption into and from the positive electrode because generally, the diffusion rate of lithium ions is low. In other words, it is important that the $Al_2O_3$ layer be formed on part of the surface of the lithium manganese complex oxide. In this case, part of the surface of the lithium manganese complex oxide on which the $Al_2O_3$ layer is not formed is in the state of being in direct contact with the electrolytic solution, and therefore, it is expected that the dissolution of manganese to some extent unavoidably occurs. This problem is particularly significant in high voltage 5 V class positive electrodes in which a reaction with the electrolytic solution occurs extremely easily.

Accordingly, it is an object of this exemplary embodiment to provide a lithium ion battery using a lithium manganese complex oxide, in which the dissolution of manganese and an increase in resistance are inhibited, and which is excellent in life characteristics at high temperature.

Solution to Problem

One aspect of this exemplary embodiment is
a lithium ion battery comprising at least a positive electrode comprising a positive electrode active material, and an electrolytic solution, wherein
the positive electrode active material is a lithium manganese complex oxide,
the positive electrode comprises a bismuth oxide, and a metal compound which is attached to part of a surface of the lithium manganese complex oxide, and
a dissolution rate of a metal of the metal compound in the electrolytic solution is lower than a dissolution rate of manganese of the lithium manganese complex oxide.

In addition, one aspect of this exemplary embodiment is
a lithium ion battery comprising at least a positive electrode comprising a positive electrode active material, and an electrolytic solution, wherein the positive electrode active material is a lithium manganese complex oxide, the positive electrode comprises a bismuth oxide, and a metal compound which is attached to part of a surface of the lithium manganese complex oxide, and the metal compound comprises one or two or more kinds selected from $TiO_2$, $Al_2O_3$, $ZrO_2$, $AlF_3$, and $BiF_3$.

Advantageous Effect of Invention

This exemplary embodiment can provide a lithium ion battery using a lithium manganese complex oxide, in which the dissolution of manganese and resistance increase are inhibited, and which is excellent in life characteristics at high temperature.

DESCRIPTION OF EMBODIMENT

A lithium ion battery in this exemplary embodiment will be described below.

The lithium ion battery in this exemplary embodiment comprises a positive electrode comprising a positive electrode active material, and an electrolytic solution. In addition, the positive electrode active material comprises a lithium manganese complex oxide. In addition, the positive electrode comprises a bismuth oxide, and a metal compound attached to part of the surface of the above lithium manganese complex oxide. In addition, the dissolution rate of the metal of the metal compound in the above electrolytic solution is lower than the dissolution rate of the manganese of the above lithium manganese complex oxide.

By attaching, to part of the surface of the lithium manganese complex oxide, the metal compound in which the dissolution rate of the metal in the electrolytic solution is lower than the dissolution rate of the manganese of the lithium manganese complex oxide, the dissolution of manganese can be effectively inhibited for a long period in a state where there is little dissolution of the metal compound. In addition, by having the bismuth oxide contained in the positive electrode active material layer, an increase in the resistance of the lithium ion battery cell can be reduced even if manganese is dissolved in the electrolytic solution. In addition, as a result of the diligent study of the inventor using various materials, it has been found that significant effects are achieved particularly in experiments using 5 V class positive electrodes.

The detailed mechanisms for these effects are not yet clear, but are presumed to be as follows. By attaching the metal compound having a low dissolution rate in the electrolytic solution to part of the surface of the lithium manganese complex oxide, a direct reaction between the electrolytic solution and the lithium manganese complex oxide is effectively inhibited. In addition, it is considered that by having bismuth oxide contained in the positive electrode active material layer, the bismuth component that is moderately dissolved in the electrolytic solution is deposited on the negative electrode to form a lithium ion-conducting compound, and an increase in resistance of the lithium ion battery is effectively reduced even if dissolution of manganese occurs.

<Positive Electrode>

As the lithium manganese complex oxide, for example, the so-called 4 V class manganese spinels represented by the following formula (1) can be used.

$$Li_xMn_2O_4 \qquad (1)$$

In formula (1), $1.02 \leq x \leq 1.08$.

In addition, as the lithium manganese complex oxide, for example, spinel type lithium manganese complex oxides having a discharge potential of 4.5 V or more versus lithium, represented by the following formula (2) are preferably used.

$$Li_a(M_bMn_{2-b-c}A_c)O_4 \qquad (2)$$

In formula (2), $0.8<a<1.2$, $0.4<b<0.6$, and $0 \leq c \leq 0.3$. M represents one or more kinds of metals selected from Ni, Co, Fe, Cr and Cu, and including at least Ni. A represents at least one element selected from Si, Ti, Mg, and Al.

Among the above lithium manganese complex oxides, particularly 5 V class manganese spinels are preferably used. When 5 V class manganese spinels are used, the effects of the present invention are particularly significantly obtained.

The lithium ion battery in this exemplary embodiment comprises a positive electrode comprising a positive electrode active material. The positive electrode is obtained, for example, by forming a positive electrode active material layer comprising a positive electrode active material, a conductivity-providing agent, and a binding agent on a current collector.

Examples of the conductivity-providing agent can include carbon materials. Examples of the carbon materials can include graphite, carbon black, and acetylene black. In addition, as the conductivity-providing agent, for example, powders of metal substances, such as Al, and conductive oxides can also be used.

The binding agent is not particularly limited, and polyvinylidene fluoride (PVdF), vinylidene fluoride-hexafluoropropylene copolymers, vinylidene fluoride-tetrafluoroethylene copolymers, styrene-butadiene copolymerized rubbers, polytetrafluoroethylene, polypropylene, polyethylene, polyimides, polyamideimides, and the like can be used.

The current collector is not particularly limited, and Al, nickel, copper, silver, or alloys thereof are preferred in terms of electrochemical stability. Examples of its shape include foil, a flat plate shape, and a mesh shape.

Examples of the method for forming the positive electrode active material layer include a doctor blade method, a die coater method, a CVD method, and a sputtering method. It is possible to previously form a positive electrode active material layer, and then form a thin film of aluminum, nickel, or an alloy thereof by a method, such as vapor deposition or sputtering, to provide a positive electrode current collector.

The content of the conductivity-providing agent is preferably about 1 to 10% by mass in the positive electrode active material layer. In addition, the content of the binding agent is also preferably about 1 to 10% by mass in the positive electrode active material layer. In such a range, the proportion of the amount of the active material in the positive electrode active material layer can be sufficiently ensured, and sufficient capacity per unit mass can be obtained.

The metal compound that can be used in this exemplary embodiment is a material in which the dissolution rate of the metal in the electrolytic solution used is lower than the dissolution rate of the manganese of the lithium manganese complex oxide used. The dissolution rate of the metal is preferably lower, and particularly, materials having low reactivity with HF present in the electrolytic solution are preferred.

Examples of the metal compound include oxides, such as $TiO_2$, $Al_2O_3$, $ZrO_2$, $Cr_2O_3$, $IrO_2$, $Ta_2O_5$, $WO_3$, $HfO_2$, $PdO$, and $RuO_2$, fluorides, such as $AlF_3$, $BiF_3$, $MgF_3$, $ZrF_4$, $ZnF_2$, and $CrF_3$, and compounds of these and lithium. Among these, the metal compound preferably comprises one or two or more kinds selected from $TiO_2$, $Al_2O_3$, $ZrO_2$, $AlF_3$ and $BiF_3$. In addition to the particularly low dissolution rate of the metal in the electrolytic solution, these are relatively easily obtained by a wet method or the like, and therefore, an advantage is that these are also advantageous in terms of cost.

In addition, in the selection of the metal compound used in this exemplary embodiment, the metal compound can be selected by actually measuring the dissolution rate in the electrolytic solution actually used, and comparing the dissolution rate with the value of the lithium manganese complex oxide. The above dissolution rate can be obtained by immersing the metal compound of interest (particulate (including powdery) or the like) in the electrolytic solution at a predetermined temperature, and measuring the concentration of metal ions dissolved in the electrolytic solution after a predetermined time. The metal ion concentration in the electrolytic solution can be analyzed, for example, by ICP atomic emission spectroscopy, atomic absorption spectroscopy, or the like. In this case, the metal compound used in the measurement is preferably one having the same or substantially the same particle diameter, crystallinity, and form as the actual one to be attached to the positive electrode active material surface. Alternatively, it is also possible to immerse the metal compound in the electrolytic solution alone or in coexistence with the positive electrode active material, and to measure the respective amounts of metal ions that were dissolved. Alternatively, by immersing the metal compound when it is in the state of being attached to the surface of the positive electrode active material, the respective amounts of metal ions dissolved can be obtained. The temperature condition is, for example, room temperature or 60° C. In addition, the manganese dissolution rate of the lithium manganese complex oxide can also be previously actually measured using the electrolytic solution that is actually used in the battery, as in the above. When actual measurement is difficult, it is possible to make an estimate, to some extent, based on the standard free energy of formation of each material.

The metal compound can be attached to part of the surface of the lithium manganese complex oxide, for example, in a particulate or film-like form. From the viewpoint of being easily attached to part of the surface of the lithium manganese complex oxide, it is preferable that the metal compound be particulate.

As the method for attaching the metal compound to the lithium manganese complex oxide, for example, solution reaction methods, such as a sol-gel method using a precursor solution, a neutralization method, and a hydrothermal method, wet methods, such as the spray application of a colloidal dispersion, and a heteroaggregation method using a difference in surface charge in a liquid, and a solid phase method by powder mixing can be used. The heteroaggregation method is, for example, a method for attaching a metal compound by adding particles of a lithium manganese complex oxide to the dispersion of metal compound particles, and aggregating the different particles together using the difference between respective surface charges. After the metal compound is attached, for example, heat treatment can be performed under an oxidizing atmosphere at 500 to 800° C. for 30 minutes to 3 hours. The metal compound can be more firmly attached to the positive electrode surface by this heat treatment.

The content of the metal compound is preferably set to 0.2 parts by mass or more and 13 parts by mass or less, more preferably 0.3 parts by mass or more and 10 parts by mass or less, and further preferably 0.5 parts by mass or more and 5.0 parts by mass or less, based on 100 parts by mass of the lithium manganese complex oxide. By setting the content of the metal compound to 13 parts by mass or less, the battery capacity is easily set in a proper range. By setting the content of the metal compound to 0.2 parts by mass or more, dissolution of manganese can be more effectively suppressed.

The bismuth oxide in this exemplary embodiment is, for example, $Bi_2O_3$, $Bi_2O$, $BiO$, $Bi_2O_4$, $Bi_3O_5$, or $Bi_2O_5$. In addition, as the bismuth oxide, crystalline matter, amorphous matter, or matter having both crystallinity and amorphousness can be used. Among these, $Bi_2O_3$ is preferred. $Bi_2O_3$ is excellent in thermal stability, and can be relatively easily synthesized.

The bismuth oxide should be contained in the positive electrode active material layer, and, for example, can be contained in the positive electrode slurry.

The content of the bismuth oxide is preferably set to 0.3 parts by mass or more and 5.0 parts by mass or less, more preferably 0.5 parts by mass or more and 3.0 parts by mass or less, based on 100 parts by mass of the above lithium manganese complex oxide. When the content of the bismuth oxide is 3.0 parts by mass or less, the battery capacity is easily set in a proper range. When the content of the bismuth oxide is 0.3 parts by mass or more, an increase in resistance can be more effectively inhibited.

For the bismuth oxide, for example, particulate matter can be used. The average particle diameter (volume average) of the bismuth oxide is preferably 0.1 μm or more and 5.0 μm or less. When the average particle diameter (volume average) of the bismuth oxide is 0.1 μm or more, the aggregation of the particles is not too strong, and the particles are easily uniformly dispersed in the positive electrode active material layer. When the average particle diameter (volume average) of the bismuth oxide is 5.0 μm or less, it can be expected that an increase in resistance is more effectively inhibited.

<Negative Electrode>

The negative electrode active material is not particularly limited as long as lithium ions can be inserted during charge and desorbed during discharge, and known ones can be used. Specific examples of the negative electrode active material include carbon materials, such as graphite, coke, and hard carbon, lithium alloys, such as lithium-aluminum alloys, lithium-lead alloys, and lithium-tin alloys, lithium metal, Si, $SnO_2$, $SnO$, $TiO_2$, $Nb_2O_3$, and SiO, and include metal oxides having lower potentials than lithium manganese complex oxide substances.

The negative electrode active material layer can be obtained, for example, by forming, on a current collector, a negative electrode slurry obtained by mixing a negative electrode active material, a conductivity-providing agent, and a binding agent. Examples of the conductivity-providing agent include carbon materials and powders of conductive oxides. As the binding agent, resin binders, such as polyvinylidene fluoride, can be used. As the current collector, metal thin films mainly comprising Cu and the like can be used.

<Separator>

The separator is not particularly limited, and, for example, in addition to microporous films based on polyolefins, such as polyethylene and polypropylene, cellulose films can be used.

<Electrolyte>

As the electrolyte, for example, liquid electrolytic solutions can be used.

The solvent contained in the electrolytic solution (also referred to as the nonaqueous electrolytic solvent) may be one usually used in an electrolytic solution. Preferred examples of the solvent include carbonates, chlorinated hydrocarbons, ethers, ketones, and nitriles. Examples of the carbonates include cyclic carbonates, such as propylene carbonate, ethylene carbonate, butylene carbonate, and vinylene carbonate; dimethyl carbonate, diethyl carbonate, ethyl methyl carbonate, and dipropyl carbonate. One nonaqueous electrolytic solvent can be used alone, or two or more kinds of nonaqueous electrolytic solvents can be used in combination. Particularly preferably, solvents obtained by selecting at least one type from ethylene carbonate (EC), propylene carbonate (PC), butylene carbonate (BC), γ-butyrolactone (GBL), and the like, as a high dielectric constant solvent, and at least one type from diethyl carbonate (DEC), dimethyl carbonate (DMC), ethyl methyl carbonate (EMC), esters, and the like, as a low viscosity solvent, and mixing these are preferably used. In addition, solvents obtained by fluorine-substituting part of the functional groups of these solvents can be used.

As the supporting salt, lithium salts can be used. Examples of the lithium salts include $LiPF_6$, $LiAsF_6$, $LiAlCl_4$, $LiClO_4$, $LiBF_4$, $LiSbF_6$, $LiCF_3SO_3$, $LiC_4F_9CO_3$, $LiC(CF_3SO_2)_2$, $LiN(CF_3SO_2)_2$, $LiN(C_2F_5SO_2)_2$, $LiB_{10}Cl_{10}$, lower aliphatic lithium carboxylate carboxylates, chloroborane lithium, lithium tetraphenylborate, LiCl, LiBr, LiI, LiSCN, LiCl, and lithium imide salts. The lithium salt concentration is, for example, 0.5 mol/l to 1.5 mol/l. In this range, an electrolytic solution having moderate density, viscosity, and electrical conductivity is easily implemented.

In addition, it is preferred that the electrolytic solution comprises a fluorine-containing ether represented by the following formula.

$$R_1-R_3-O-CH_2-R_4-R_2 \quad (3)$$

In formula (3), $R_1$ and $R_2$ are represented by $CH_mF_{3-m}$ (m is an integer of 0 to 3), $R_3$ and $R_4$ are represented by $CH_nF_{2-n}$ (n is an integer of 0 to 2), and at least one of $R_1$ to $R_4$ contains at least one fluorine atom.

In addition, the electrolytic solution can contain various additives. Examples of the additives include aliphatic carboxylates, such as methyl formate, methyl acetate, and ethyl propionate, γ-lactones, such as γ-butyrolactone, chain ethers, such as 1,2-ethoxyethane (DEE) and ethoxymethoxyethane (EME), cyclic ethers, such as tetrahydrofuran and 2-methyltetrahydrofuran, dimethyl sulfoxide, 1,3-dioxolane, formamide, acetamide, dimethylformamide, dioxolane, acetonitrile, propylnitrile, nitromethane, ethyl monoglyme, phosphate triesters trimethoxymethane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propane sultone, anisole, and N-methylpyrrolidone. These additives can form, on the surface of the positive electrode and/or the negative electrode, a film that inhibits a reaction with the electrolytic solution.

In addition, instead of the electrolytic solution, a polymer electrolyte may be used. In other words, the electrolyte is not limited to liquid electrolytes, but also includes solid electrolytes. Examples of the solid electrolytic solutions include gel electrolytes obtained by impregnating polymers, such as polyacrylonitrile and polyacrylates, with the above liquid electrolytic solutions, and solid electrolytes, such as LiPON and $Li_2S-LiP_xO_y$ (x=1 to 2, and y=2 to 4).

The electrolytic solution composition and the concentration of the lithium salt may be appropriately selected and adjusted considering the environment in which the battery is used, optimization for the battery application, and the like.

The lithium ion battery in this exemplary embodiment can be manufactured, for example, by the following steps. First, a negative electrode and a positive electrode are laminated via a separator in a dry air or inert gas atmosphere to obtain a laminate. This laminate is wound, and then housed in a packaging container, such as a can case, and an electrolytic solution is injected. Then, sealing is performed with a flexible film comprising a synthetic resin and metal foil, or the like.

The configuration and shape of the lithium ion battery in this exemplary embodiment are not particularly limited, and, for example, the lithium ion battery can take the form of a wound type in which a positive electrode and a negative electrode that are opposite each other with a separator sandwiched therebetween are wound, a laminated type, or the like. In addition, the lithium ion battery in this exemplary embodiment can take the form of a coin type, a laminate pack, a prismatic cell, a cylindrical cell, or the like.

As well, one aspect of this exemplary embodiment is a lithium ion battery comprising at least a positive electrode comprising a positive electrode active material, and an electrolyte, wherein the above positive electrode active material is a lithium manganese complex oxide, the above positive electrode comprises a bismuth oxide, and a metal compound attached to part of the surface of the above lithium manganese complex oxide, and the above metal compound comprises one or two or more kinds selected from $TiO_2$, $Al_2O_3$, $ZrO_2$, $AlF_3$, and $BiF_3$.

When metal compound particles comprising one or two or more kinds selected from $TiO_2$, $Al_2O_3$, $ZrO_2$, $AlF_3$ and $BiF_3$ are used, the dissolution of manganese can be more effectively suppressed. In addition, it is thought that by having bismuth oxide particles contained in the positive electrode, the bismuth component that is moderately dissolved in the electrolytic solution will be deposited on the negative electrode to form a lithium ion-conducting compound, and an increase in resistance of the lithium ion battery will be effectively suppressed even if dissolution of the manganese occurs.

EXAMPLE

The present invention will be described below by giving an Example.

Manufacturing Example 1

In Example 1, as a lithium manganese complex oxide, $LiNi_{0.5}Mn_{1.37}Ti_{0.13}O_4$ (hereinafter described as a 5 V class manganese spinel) was used. $TiO_2$ was attached to the surface of the lithium manganese complex oxide using a sol-gel method.

(Method for Attaching $TiO_2$ to Surface of 5 V Class Manganese Spinel)

As the precursor of $TiO_2$, titanium tetrabutoxide (Ti $(OC_4H_9)_4$, a first grade reagent manufactured by Wako Pure Chemical Industries, Ltd., hereinafter referred to as TBT) was used. 48 ml of water was dripped while a mixed liquid of 2 ml of TBT and 5 ml of acetic acid was stirred in ice water, and the mixture was stirred for 3 hours. Then, a powder of the 5 V class manganese spinel was added, and stirring was continued in the ice water for 24 hours. Then, the mixture was transferred to an oven heated to 95° C. and dried. The obtained gel-like sample was calcined at 600° C. (air atmosphere) for 2 hours to obtain a powder sample.

The crystalline state of the $TiO_2$ obtained by the above sol-gel method was observed by powder X-ray diffraction (XRD), and the form of attachment of the $TiO_2$ to the 5 V class manganese spinel surface was observed by a scanning electron microscope (SEM). The amount attached was analyzed by ICP-MS. The amount of $TiO_2$ attached was 2 parts by mass based on the positive electrode active material.

Figure 1:
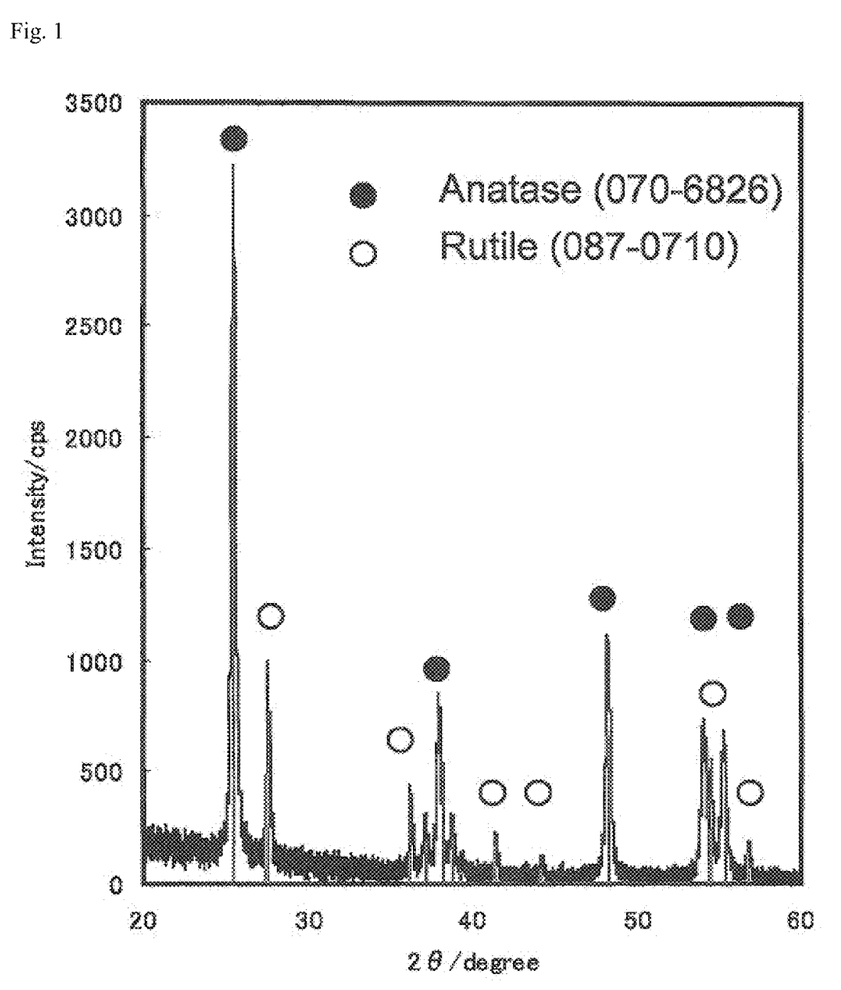
FIG. 1 is a diagram showing the XRD pattern of $TiO_2$ obtained in Manufacturing Example 1.

The XRD pattern of the obtained $TiO_2$ is shown in FIG. 1.

(Method for Evaluating Amount of Manganese Dissolved in Electrolytic Solution)

Figure 2:
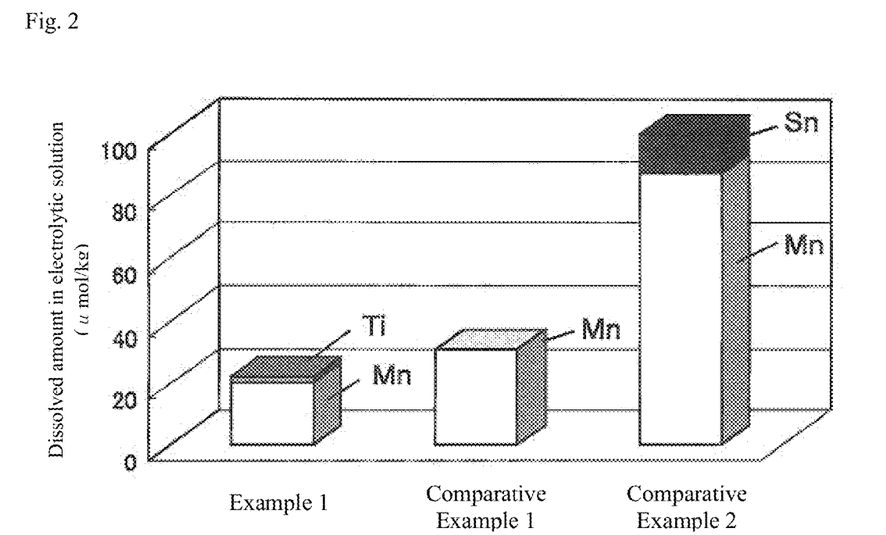
FIG. 2 is a diagram showing the results of measuring the amount of manganese dissolved in an electrolytic solution.

The amount of manganese dissolved was evaluated by examining the amount of manganese dissolved from the 5 V class manganese spinel immersed in an electrolytic solution. 40 ml of an electrolytic solution (1 M $LiPF_6$, ethylene carbonate:dimethyl carbonate=40:60) was placed in a screw cap pressure bottle, and 100 mg of the 5 V class manganese spinel powder was added and sufficiently dispersed. Then, the bottle was hermetically sealed, and held in an oven whose temperature had been previously increased to predetermined 60° C., for 20 hours. Then, the sample solution was filtered by a membrane filter, and the manganese concentration in the obtained filtrate was quantified by ICP-MS to measure the amount of dissolved manganese. The result is shown in FIG. 2. In addition, the amount of $TiO_2$ attached to the spinel surface, dissolved in the electrolytic solution, was also examined by ICP-MS analysis as for manganese.

Reference Example 1

For the untreated 5 V class manganese spinel, the amount of manganese dissolved in the electrolytic solution was evaluated as in Example 1.

Reference Example 2

SnO (manufactured by Kojundo Chemical Laboratory Co., Ltd.) was attached to the surface of the 5 V class manganese spinel by dry-mixing using an agate mortar followed by calcining at 600° C. for 2 hours, and the amount of manganese dissolved in the electrolytic solution was evaluated as in Example 1. The amount of SnO attached to the spinel surface, dissolved in the electrolytic solution, was also examined by ICP-MS analysis as for manganese.

Reference Example 3

Figure 3:
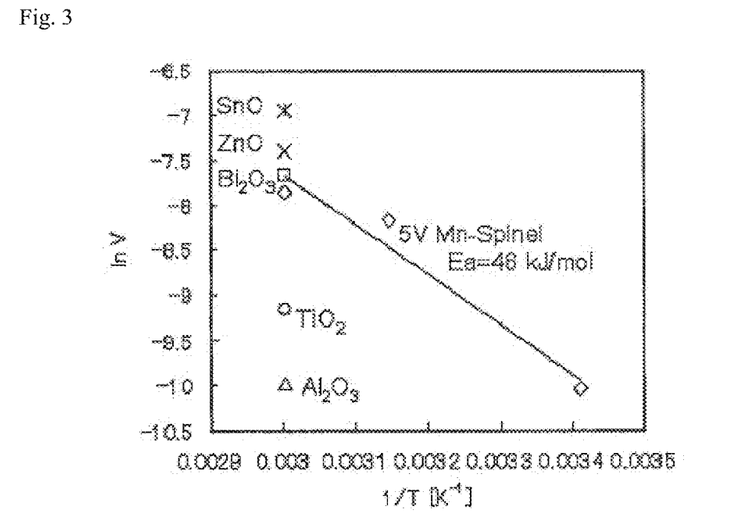
FIG. 3 is a diagram showing the results of examining the dissolution rate V (μmol/min) in the electrolytic solution for each material.

In the selection of a metal compound to be attached to the 5 V class manganese spinel surface, the dissolution rate V (μmol/min) of each material shown in Table 1 alone in the electrolytic solution was examined, and is shown in FIG. 3. The dissolution rate of the Bi of $Bi_2O_3$ is also shown in FIG. 3.

TABLE 1

| Metal compound | Average particle diameter (μm) | Crystal structure |
|---|---|---|
| $Al_2O_3$ | 0.03 | Cubic crystal/orthorhombic crystal |
| $Bi_2O_3$ | 0.05 | Tetragonal crystal |
| $TiO_2$ | 0.04 | Anatase |
| ZnO | 0.03 | Hexagonal crystal |
| SnO | — | Tetragonal crystal |

Example 1

A lithium ion battery cell was fabricated using the $TiO_2$-attached 5 V class manganese spinel obtained in Manufacturing Example 1, and capacity retention rates after charge and discharge cycles, and changes in impedance were measured.

(Fabrication of Lithium Ion Battery Cell)

The $TiO_2$-attached 5 V class manganese spinel comprising $Bi_2O_3$ at a content of 1% by mass was dry-mixed with carbon black as a conductivity-providing agent. This mixture was uniformly dispersed in N-methyl-2-pyrrolidone (NMP) in which polyvinylidene fluoride (PVDF) as a binder was dissolved, to prepare a positive electrode slurry.

Next, the obtained positive electrode slurry was applied onto aluminum metal foil (thickness 20 μm), which was a positive electrode current collector, and then, the NMP was evaporated to form a positive electrode active material layer having a film thickness of 70 μm. The solid ratio in the positive electrode active material layer was set to the ratio of the active material (including $Bi_2O_3$):the conductivity-providing agent:PVDF=91:5:4 (% by mass).

Also for the negative electrode, similarly, materials were mixed so as to provide a ratio of graphite:PVDF=94:6 (% by mass) as a solid ratio, the mixture was dispersed in NMP, and the slurry was applied onto copper foil (thickness 10 μm), which was a negative electrode current collector, to form a negative electrode active material layer having a film thickness of 50 μm.

The negative electrode was cut into the shape of the negative electrode active material layer of 30 mm×14 mm and the current collector of 5 mm×5 mm extending in the right short side portion of the negative electrode active material layer. The positive electrode was cut into the shape of the positive electrode active material layer of 28 mm×13 mm and the current collector of 5 mm×5 mm extending in the left short side portion of the positive electrode active material layer. The cut negative electrode and positive electrode were laminated via a separator. Then, an aluminum tab with a sealant having a width of 5 mm, a length of 20 mm, and a thickness of 0.1 mm, and a nickel tab with a sealant having the same size were ultrasonically welded to the positive electrode current collector and the negative electrode current collector, respectively, and integrated so that the tabs and the current collectors were electrically connected.

As the package of the battery cell, a 125 μm thick 70 mm×70 mm aluminum laminate film comprising polypropylene and aluminum foil was used. This aluminum laminate film was folded in two, and the laminate was inserted. The sides except for one side, at which the electrolytic solution was to be injected, were adhered by heat sealing. Then, the electrolytic solution was injected, and the laminate was impregnated with the electrolytic solution under reduced pressure. Then, the opening was vacuum-sealed to fabricate a laminate type lithium ion battery cell.

(Charge and Discharge Evaluation)

High temperature cycle characteristics were evaluated using the fabricated laminate type lithium ion battery cell.

The conditions of the cycle evaluation were set to a charge rate of 1.0 C, a discharge rate of 1.0 C, a charge termination voltage of 4.75 V, and a discharge termination voltage of 3.0 V at a temperature of 45° C.

Figure 4:
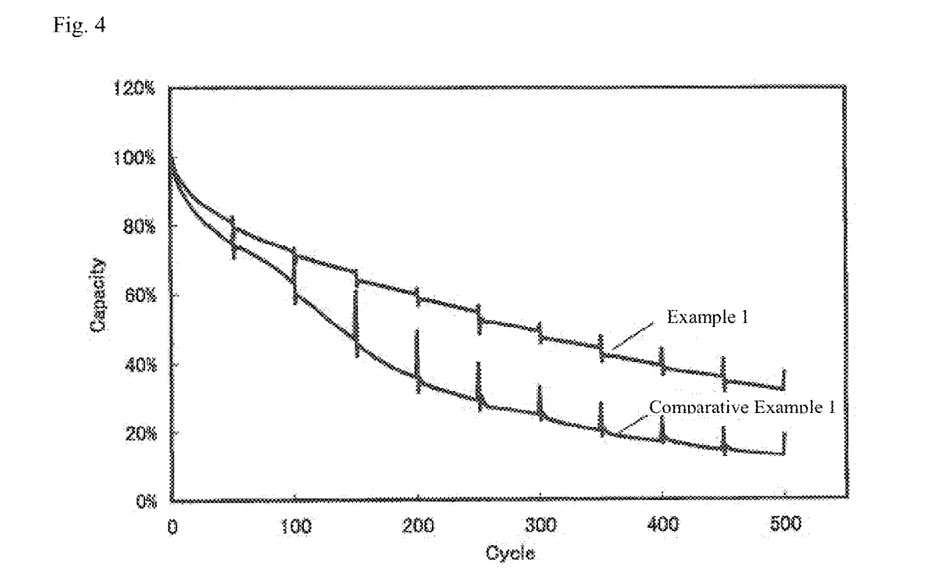
FIG. 4 is a diagram showing the results of measuring capacity retention rates associated with cycles.
Figure 5:
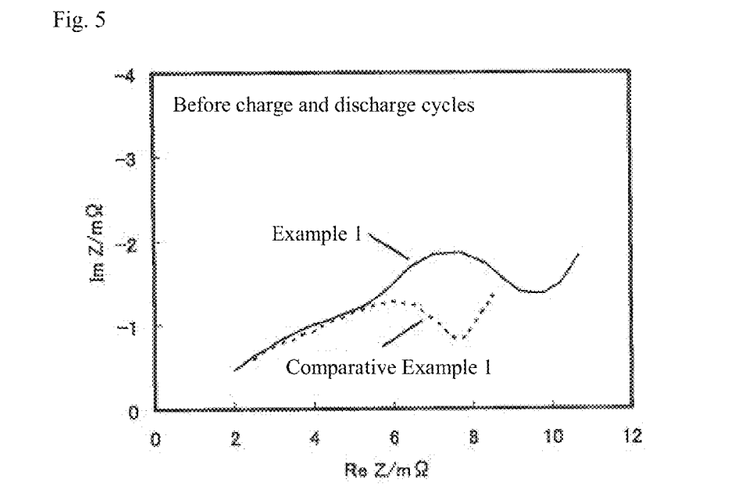
FIG. 5 is a diagram showing the results of evaluating changes in impedance before cycles.
Figure 6:
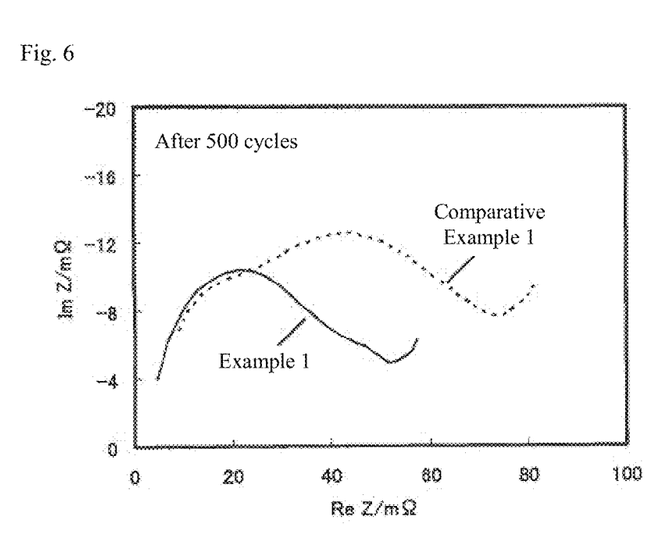
FIG. 6 is a diagram showing the results of evaluating changes in impedance after cycles.

The capacity retention rates after the cycles are shown in FIG. 4, and the changes in impedance (during 4.75 V charge) before and after the cycles are shown in FIG. 5 and FIG. 6.

Comparative Example 1

A lithium ion battery cell was fabricated and evaluated as in Example 1 except that the untreated 5 V class manganese spinel was used instead of the $TiO_2$-attached 5 V class manganese spinel.

From the results in FIG. 2, compared with the untreated 5 V class manganese spinel, in the 5 V class manganese spinel to which $TiO_2$ was attached, the amount of manganese dissolved in the electrolytic solution at high temperature decreased. On the contrary, in Reference Example 2 in which SnO in which the dissolution rate of Sn in the electrolytic solution was high was attached, the amount of manganese dissolved increased.

From the results in FIG. 4, it was found that in the lithium ion battery in this exemplary embodiment, the capacity retention rates after the charge and discharge cycles were good.

In addition, from the impedance measurement results in FIG. 5 and FIG. 6, it was found that in the lithium ion battery in this exemplary embodiment, an increase in cell resistance after the cycles was suppressed.

This application claims priority to Japanese Patent Application No. 2011-178299 filed on Aug. 17, 2011, the entire disclosure of which is incorporated herein.

While the invention of this application has been described with reference to the exemplary embodiment and the Example, the invention of this application is not limited to the above exemplary embodiment and Example. Various changes that can be understood by those skilled in the art can be made in the configuration and details of the invention of this application within the scope of the invention of this application.

The invention claimed is:

1. A lithium ion secondary battery comprising at least a positive electrode, the positive electrode comprising a positive electrode active material and an electrolytic solution, wherein
    the positive electrode active material is a lithium manganese complex oxide,
    the positive electrode comprises a bismuth oxide and a metal compound which is attached to part of a surface of the lithium manganese complex oxide, and
    a dissolution rate of a metal of the metal compound in the electrolytic solution is lower than a dissolution rate of manganese of the lithium manganese complex oxide, wherein the metal compound comprises at least one compound selected from $TiO_2$, $Al_2O_3$, $ZrO_2$, $AlF_3$ and $BiF_3$.

2. The lithium ion secondary battery according to claim 1, wherein the metal compound has particulate form.

3. The lithium ion secondary battery according to claim 2, wherein the bismuth oxide and the lithium manganese complex oxide have particulate form.

4. The lithium ion secondary battery according to claim 1, wherein a content of the metal compound is 0.2 parts by mass or more and 13 parts by mass or less based on 100 parts by mass of the lithium manganese complex oxide.

5. The lithium ion secondary battery according to claim 1, wherein the bismuth oxide is represented by $Bi_2O_3$.

6. The lithium ion secondary battery according to claim 1, wherein a content of the bismuth oxide is 0.3 parts by mass or more and 5.0 parts by mass or less based on 100 parts by mass of the lithium manganese complex oxide.

7. The lithium ion secondary battery according to claim 1, wherein the lithium manganese complex oxide is a spinel type lithium manganese complex oxide that is represented by the following formula (1) and that has a discharge potential of 4.5 V or more versus lithium;

$$Li_a(M_bMn_{2-b-c}A_c)O_4 \quad (1)$$

wherein $0.8<a<1.2$, $0.4<b<0.6$, and $0 \leq c \leq 0.3$; M represents one or more kinds of metals selected from Ni, Co, Fe, Cr and Cu, and including at least Ni; and A represents at least one element selected from Si, Ti, Mg and Al.

8. The lithium ion secondary battery according to claim 1, wherein the electrolytic solution comprises a fluorine-containing ether represented by the following formula (2);

$$R_1-R_3-O-CH_2-R_4-R_2 \quad (2)$$

wherein R1 and R2 are represented by $CH_mF_{3-m}$ (m is an integer of 0 to 3), $R_3$ and $R_4$ are represented by $CH_nF_{2-n}$ (n is an integer of 0 to 2), and at least one of $R_1$ to $R_4$ contains at least one fluorine atom.

9. The lithium ion secondary battery according to claim 1, wherein the lithium manganese complex oxide has spinel structure.

10. The lithium ion secondary battery according to claim 9, wherein the bismuth oxide is at least one selected from $Bi_2O_3$, $Bi_2O$, $BiO$, $Bi_2O_4$, $Bi_3O_5$, and $Bi_2O_5$.

11. The lithium ion secondary battery according to claim 10, wherein the bismuth oxide has particulate form, and the average particle diameter of the bismuth oxide is 0.1 μm or more and 5.0 μm or less.

12. The lithium ion secondary battery according to claim 11, wherein the metal compound has particulate form, and the lithium manganese complex oxide has particulate form.

13. The lithium ion secondary battery according to claim 12, wherein a content of the metal compound is 0.2 parts by mass or more and 13 parts by mass or less based on 100 parts by mass of the lithium manganese complex oxide.

14. The lithium ion secondary battery according to claim 13, wherein a content of the bismuth oxide is 0.3 parts by mass or more and 5.0 parts by mass or less based on 100 parts by mass of the lithium manganese complex oxide.

15. The lithium ion secondary battery according to claim 14, wherein the lithium manganese complex oxide is a spinel type lithium manganese complex oxide that is represented by the following formula (1) and that has a discharge potential of 4.5 V or more versus lithium;

$$Li_a(M_bMn_{2-b-c}A_c)O_4 \quad (1)$$

wherein $0.8<a<1.2$, $0.4<b<0.6$, and $0 \leq c \leq 0.3$; M represents one or more kinds of metals selected from Ni, Co, Fe, Cr and Cu, and including at least Ni; and A represents at least one element selected from Si, Ti, Mg and Al.

16. The lithium ion secondary battery according to claim 15, wherein the electrolytic solution comprises a fluorine-containing ether represented by the following formula (2);

$$R_1-R_3-O-CH_2-R_4-R_2 \quad (2)$$

wherein $R_1$ and $R_2$ are represented by $CH_mF_{3-m}$ (m is an integer of 0 to 3), $R_3$ and $R_4$ are represented by $CH_nF_{2-n}$ (n is an integer of 0 to 2), and at least one of $R_1$ to $R_4$ contains at least one fluorine atom.

17. The lithium on battery according to claim 3, wherein a content of the metal compound is 0.2 parts by mass or more and 13 parts by mass or less based on 100 parts by mass of the lithium manganese complex oxide.

* * * * *